United States Patent [19]
Klonel et al.

[11] Patent Number: 6,128,853
[45] Date of Patent: Oct. 10, 2000

[54] BALL WHEELED PLANTER AND METHOD

[76] Inventors: Ronald S. Klonel; R. Ann Klonel, both of 2191 Hainlin Ct., Deltona, Fla. 32738

[21] Appl. No.: 09/036,764

[22] Filed: Mar. 9, 1998

[51] Int. Cl.[7] .................................................. A47G 47/00
[52] U.S. Cl. ............................................................. 47/39
[58] Field of Search ..................... 47/39, 65, 71

[56] References Cited

U.S. PATENT DOCUMENTS

| | | |
|---|---|---|
| 1,820,843 | 8/1931 | Spitz . |
| 2,707,351 | 5/1955 | Walker ........................................ 47/39 |
| 2,947,548 | 8/1960 | Bard ....................................... 280/79.2 |
| 3,041,782 | 7/1962 | Bachman ................................... 47/39 |
| 3,528,676 | 9/1970 | Marcandalli ........................... 280/79.2 |
| 3,676,953 | 7/1972 | Delogne ................................... 47/38.1 |
| 4,261,447 | 4/1981 | Arias et al. ........................... 190/18 A |
| 4,638,595 | 1/1987 | Rivero ....................................... 47/39 |
| 5,094,031 | 3/1992 | Lee ............................................ 47/66 |
| 5,309,670 | 5/1994 | Bates ........................................ 47/71 |
| 5,819,469 | 10/1998 | Hsu ............................................ 47/39 |

FOREIGN PATENT DOCUMENTS 2667492  4/1992  France ...................................... 47/71

*Primary Examiner*—Thomas Price
*Attorney, Agent, or Firm*—Edward M. Livingston, Esq.

[57] ABSTRACT

A ball-wheeled planter has ball wheels (5) in sockets (6) attached to portions of bottoms (2) of a plant container (1). Preferably the planter has trickle irrigation and fertilizer conveyances (13) from a fluid container (12, 16, 28, 29, 36, 41) proximate a top portion (9) of the planter. A drain basin (10, 20, 23, 25, 31) can have a convenient return pump (17) with manual, electrical or wick operation for returning flow-through water to a top portion of soil in the planter. The fluid container can have regulated outflow to match needs of particular plants (37), soil (38), planter depth and ambient conditions.

6 Claims, 7 Drawing Sheets

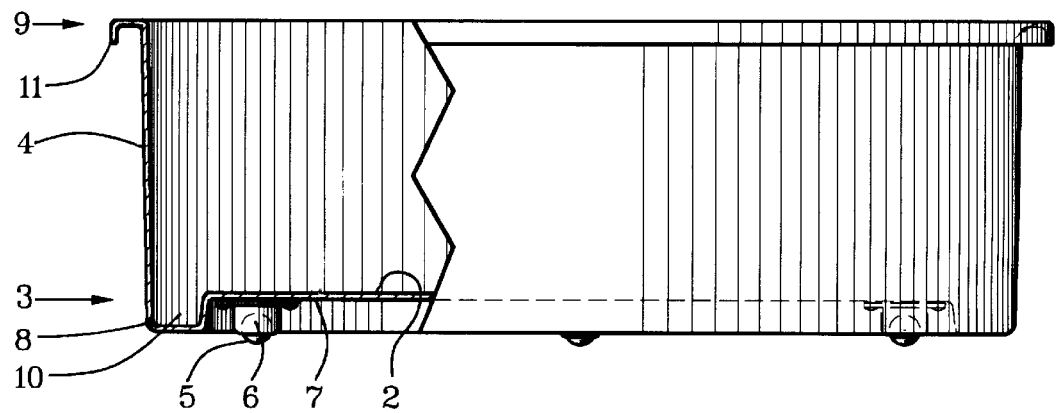
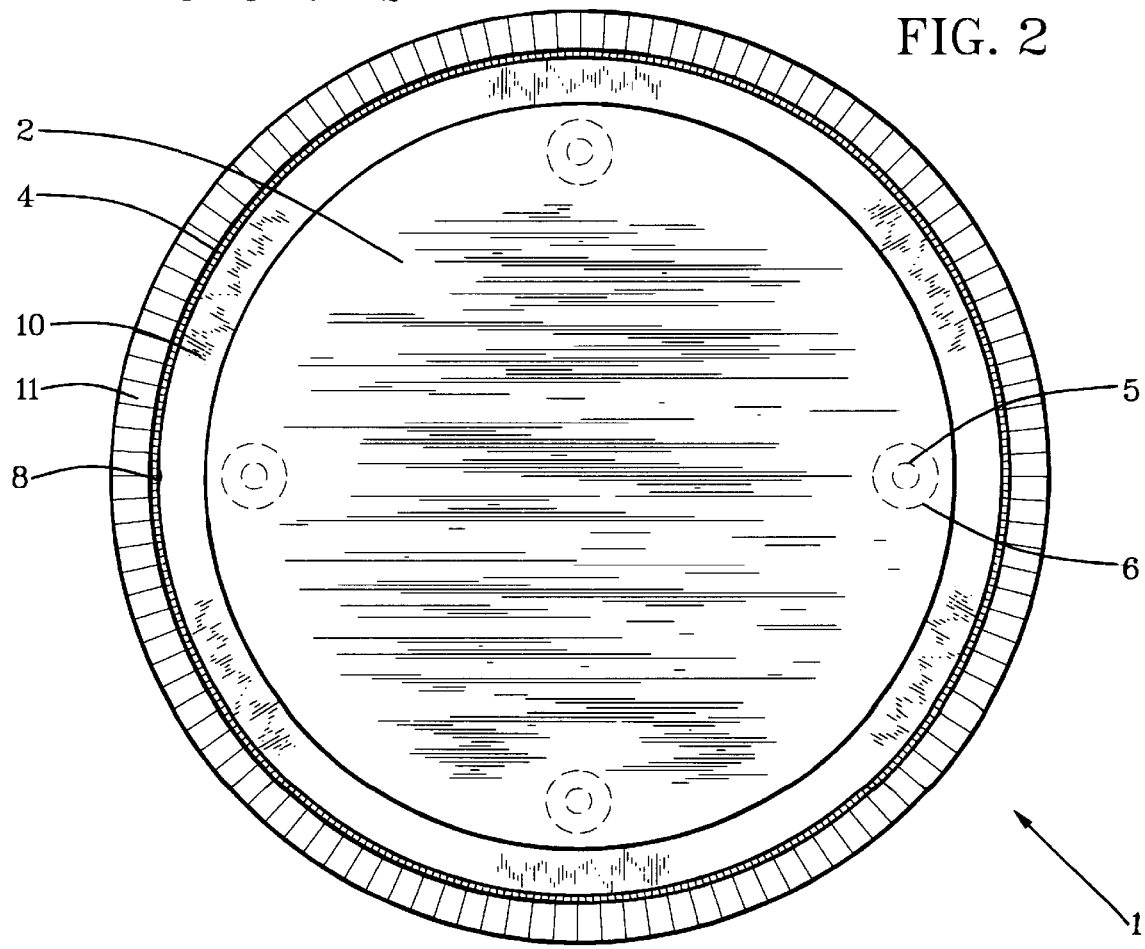

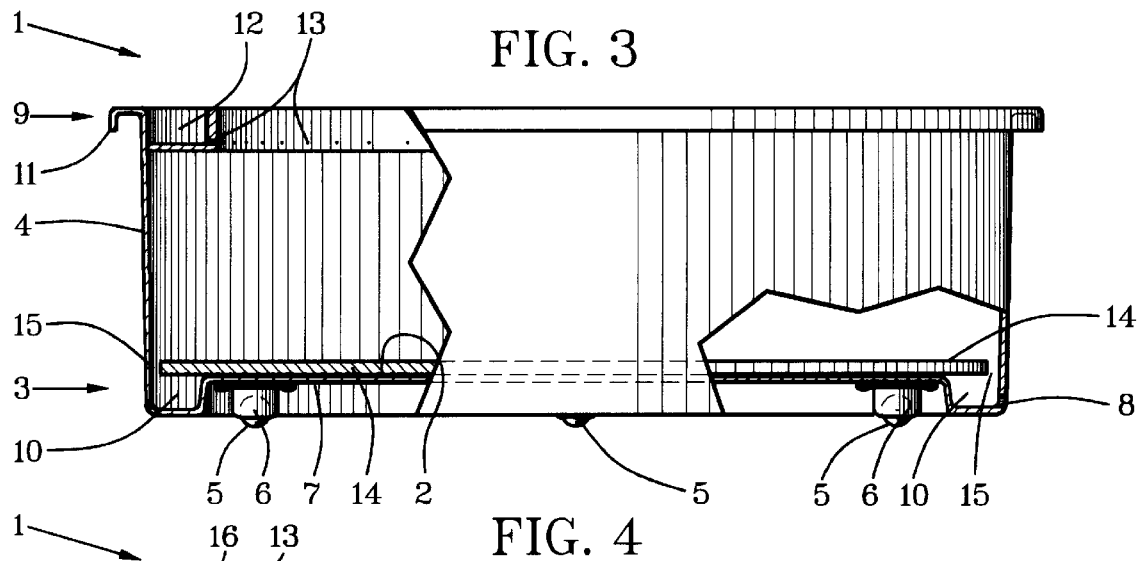
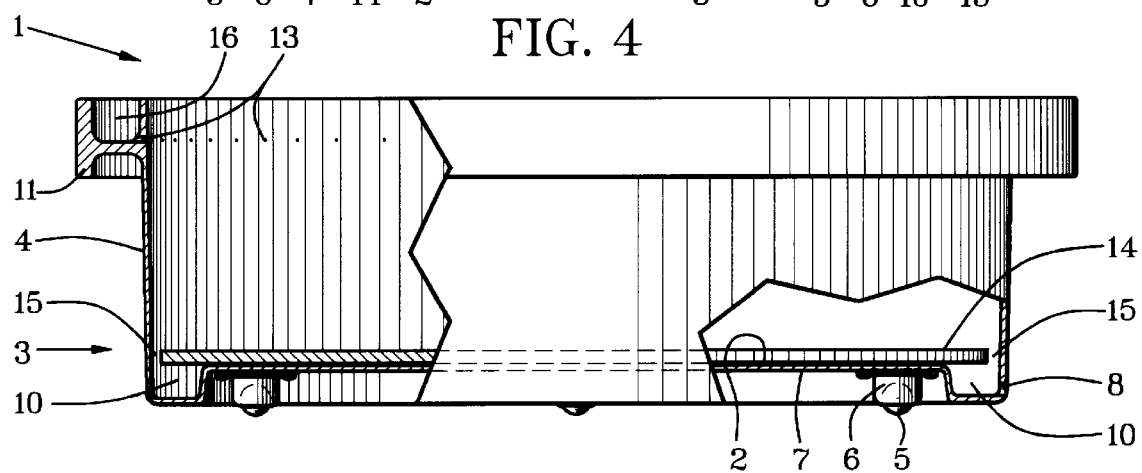
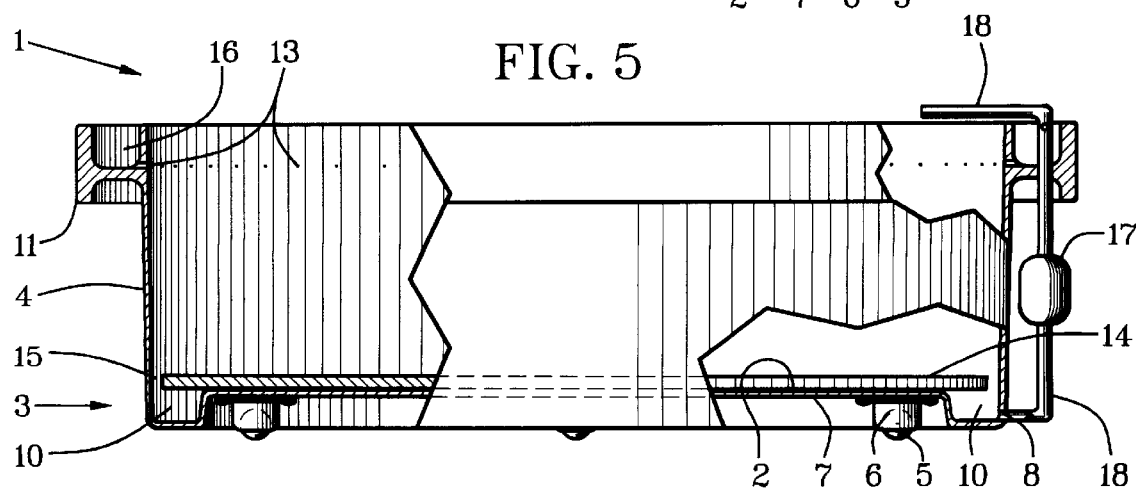

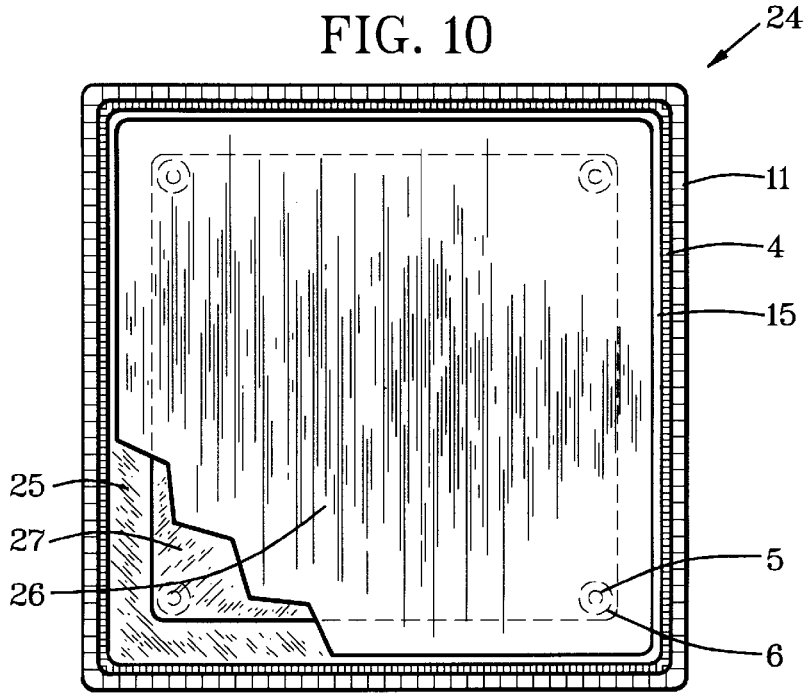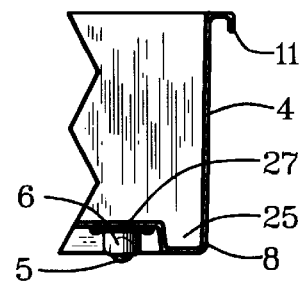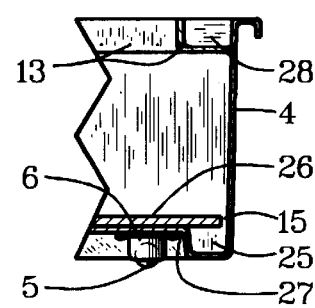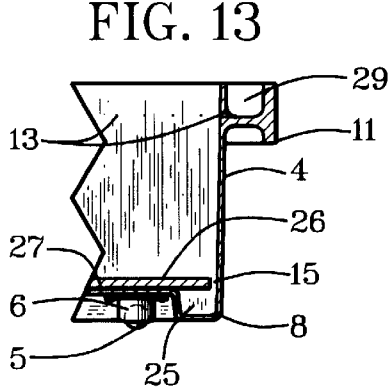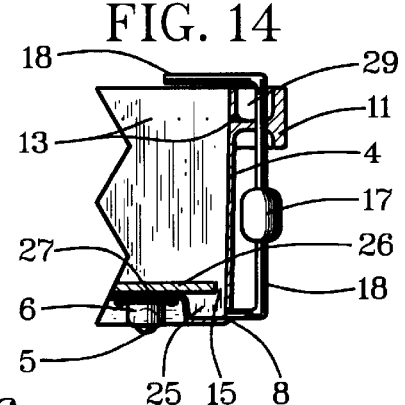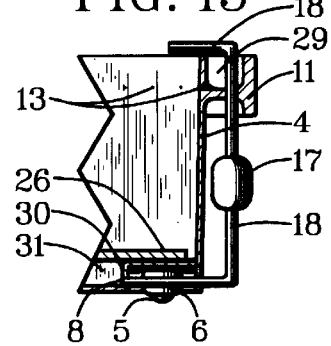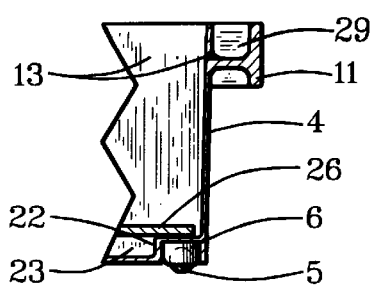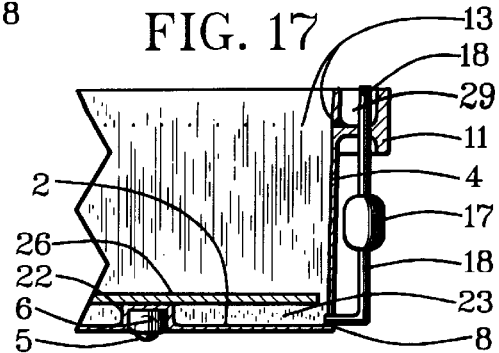

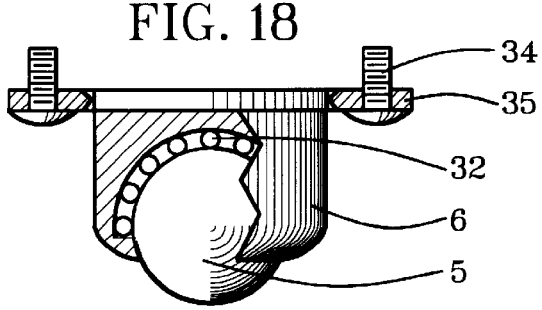
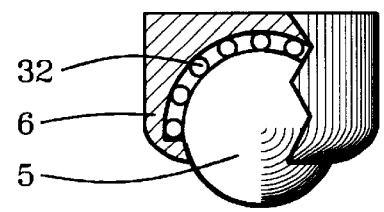
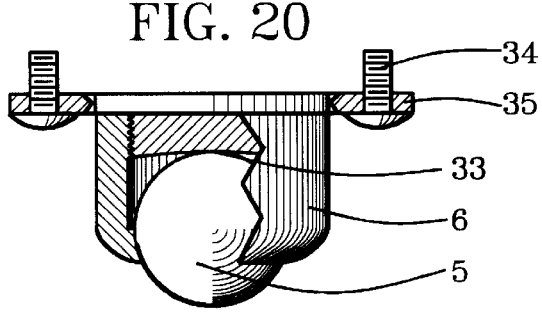
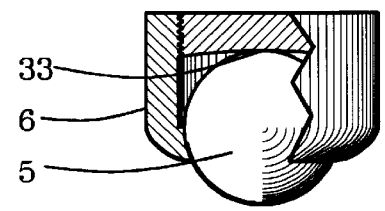
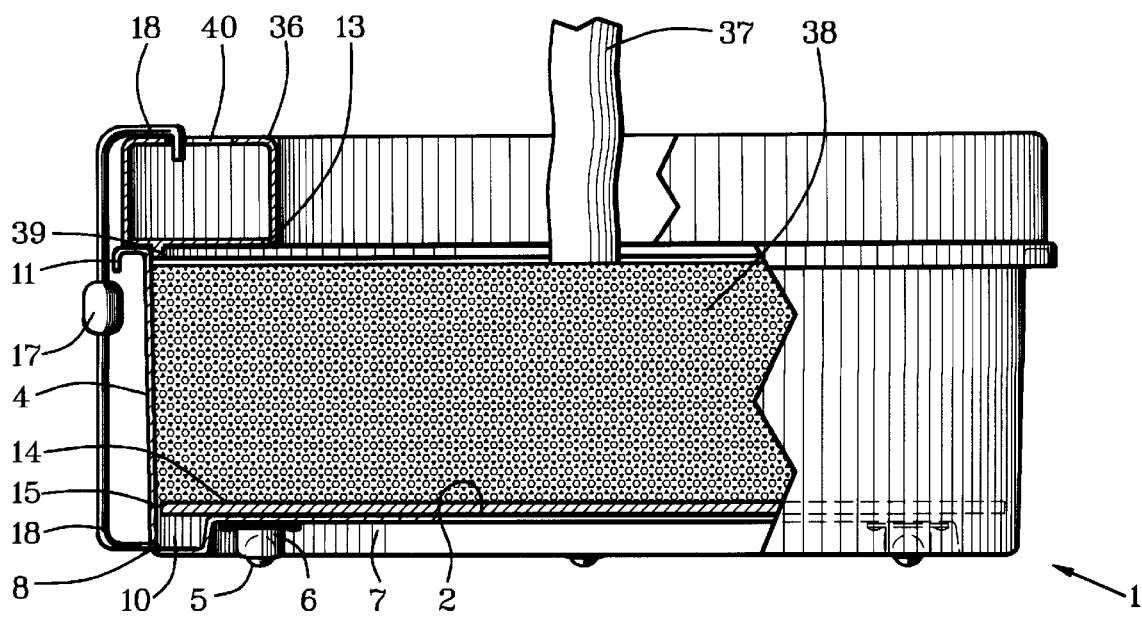

BALL WHEELED PLANTER AND METHOD

BACKGROUND OF THE INVENTION

This invention relates to planters on wheels and more particularly to irrigation and fertilization planters on omnidirectional, space-saving ball wheels.

Need to move relatively heavy and large potted plants in and out of doors and from-place-to-place has resulted in a wide variety of known plant pots on wheels. None, however, have plant-support systems on ball wheels that are omnidirectional in a manner taught by this invention.

Examples of different but related plant pots on wheels are described in the following patent documents. U.S. Pat. No. 5,094,031, issued to Lee on Mar. 10, 1992, described a wheeled plant pot having a towing hook and wheels with gear locks. U.S. Pat. No. 4,638,595, issued to Rivero on Jan. 27, 1987, described inwardly projecting spring members to hold plant pots in place on a movable platform that supported a drip pan on wheels. U.S. Pat. No. 3,676,953, issued to Delogne on Jul. 18, 1972, described a wheeled plant box having wicks in capillary conveyance of water upwardly from a drip pan to soil in the wheeled plant box. U.S. Pat. No. 3,528,676, issued to Marcandalli on Sep. 15, 1970, described a plant container on casters that were hidden by side mantles. U.S. Pat. No. 3,041,782, issued to Bachman on Jul. 3, 1962, described a large rectangular planter on casters for. U.S. Pat. No. 1,820,843, issued to Spitz on Aug. 25, 1931, described a plant stand with casters and having a drip pan below separated boards on which a plant pot was positioned.

SUMMARY OF THE INVENTION

In light of wheel-space problems and plant-irrigation and fertilization problems with conventional plant pots and planters on wheels, objects of patentable novelty and utility taught by this invention are to provide a ball-wheeled planter which:

Requires very little space for wheeled mobility;

Can be structured for a wide range of sizes and types of planters and plant containers;

Provides omnidirectional mobility of planters having bottom surfaces closer to floor surfaces than with present wheeled means;

Has fertilizing and watering means which do not require much time and attention.;

Allows bottom surfaces of planters to be positioned close to floor surfaces; and Is inexpensive to produce.

This invention accomplishes these and other objectives with ball wheels in low-friction sockets attached to portions of bottoms of a planter. Preferably the planter has trickle irrigation and fertilizer outlets from a fluid-container reservoir proximate a top portion of the planter. A drain basin can have a convenient return pump with manual, electrical or wick operation for returning flow-through water to a top portion of soil in the planter. The reservoir can have regulated outflow to match needs of particular plants, soil, planter depth and ambient conditions. Circular and rectangular plant containers are provided with a selection of drain basins and trickle-irrigation features.

The above and other objects, features and advantages of the present invention should become even more readily apparent to those skilled in the art upon a reading of the following detailed description in conjunction with the drawings wherein there is shown and described illustrative embodiments of the invention.

BRIEF DESCRIPTION OF DRAWINGS

This invention is described by appended claims in relation to description of a preferred embodiment with reference to the following drawings which are described briefly as follows:

FIG. 1 is a partially cutaway side elevation view of a ball-wheeled planter that is a circular and has a circular socket receptacle positioned circumferentially inside of a toroidal drain basin;

FIG. 2 is a top view of the FIG. 1 illustration;

FIG. 3 is the FIG. 1 illustration with addition of a toroidal sprinkle-irrigation channel positioned internally from a top portion of a container perimeter and having also a drain-basin cover with drain-water conveyance;

FIG. 4 is a partially cutaway side elevation view of a ball-wheeled planter that is a circular with a circular socket receptacle positioned circumferentially inside of a toroidal drain basin with a drain-basin cover and having a toroidal sprinkle-irrigation channel positioned externally from a top portion of a container perimeter;

FIG. 5 is the FIG. 4 illustration with addition of a return pump with a conveyance intermediate the drain basin, the sprinkle-irrigation channel and optionally an interior of the ball-wheeled planter;

FIG. 10 is a partially cutaway top view of a ball-wheeled planter that is a rectangular and has a rectangular socket receptacle positioned inside of a rectangularly toroidal drain basin;

FIG. 11 is a partially cutaway side view of a side portion of the FIG. 10 illustration;

FIG. 12 is a partially cutaway side view of a side portion of a rectangular ball-wheeled planter having a rectangularly toroidal irrigation channel inside of a rectangular container perimeter and having a rectangularly toroidal drain basin outside of a rectangular socket receptacle;

FIG. 13 is a partially cutaway side view of a side portion of a rectangular ball-wheeled planter having a rectangularly toroidal irrigation channel outside of a rectangular container perimeter and having a rectangularly toroidal drain basin outside of a rectangular socket receptacle;

FIG. 14 is the FIG. 13 illustration with addition of a return pump;

FIG. 15 is a partially cutaway side view of a side portion of a rectangular ball-wheeled planter having a rectangularly toroidal irrigation channel outside of a rectangular container perimeter and having a rectangularly toroidal socket receptacle outside of a rectangular drain basin in addition to a return pump;

FIG. 16 is a partially cutaway side view of a side portion of a rectangular ball-wheeled planter having a rectangularly toroidal irrigation channel outside of a rectangular container perimeter and having one of a plurality of unitary socket receptacles raised at an edge of a rectangular drain basin;

FIG. 17 is the FIG. 16 illustration with one of a plurality of unitary socket receptacles raised within a rectangular drain basin and including a return pump;

FIG. 18 is a partially cutaway side view of a ball wheel in a bolt-on socket having low-friction ball-bearing containment of the ball wheel;

FIG. 19 is a partially cutaway side view of a ball wheel in a plug-in socket having low-friction ball-bearing containment of the ball wheel;

FIG. 20 is the FIG. 18 illustration having bearing-point contact between a ball wheel and a bearing surface, either of which can have a contact surface which is a non-lubricated solid and either of which can be the ball wheel or a bearing surface;

FIG. 21 is the FIG. 19 illustration having bearing-point contact between a ball wheel and a bearing surface, either of which can have a contact surface which is a non-lubricated solid and either of which can be the ball wheel or a bearing surface;

FIG. 22 is a partially cutaway side view of at least one fluid container positioned on a plant container and having trickle-irrigation conveyances in addition to an optional return pump;

DESCRIPTION OF PREFERRED EMBODIMENT

Figure 6:
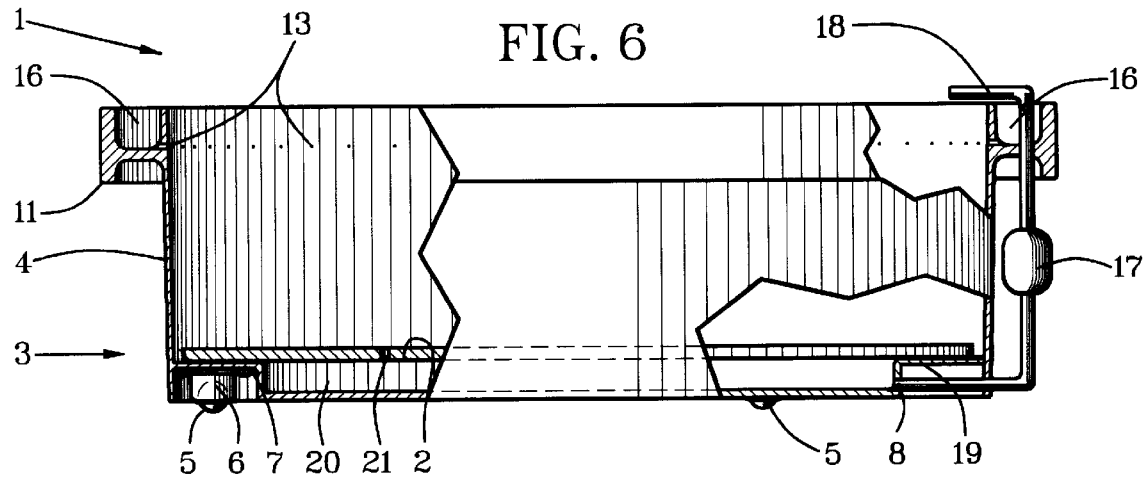
FIG. 6 is a partially cutaway side elevation view of a ball-wheeled planter that is a circular with a toroidal socket receptacle positioned radially outside of a circular drain basin with a drain-basin cover and having a toroidal sprinkle-irrigation channel positioned externally from a top portion of a container perimeter in addition to a return pump.

Terms used to describe features of this invention are listed below with numbering in the order of their initial use with reference to the drawings. These terms and numbers assigned to them designate the same features wherever used throughout this description.

1. Plant container
2. Container floor
3. Container base
4. Container perimeter
5. Ball wheels
6. Sockets
7. Socket receptacle
8. Fluid outlet
9. Top portion of plant container
10. Toroidal drain basin
11. Container handle
12. Inside toroidal irrigation channel
13. Trickle-irrigation conveyances
14. Drain-basin cover
15. Fluid conveyance
16. Outside torodial irrigation channel
17. Return pump
18. Return conveyance
19. Raised toroidal step
20. Circular drain basin
21. Drain apertures
22. Unitary socket receptacles
23. Full-floor drain basin -continued 24. Rectangular plant container
25. Rectangularly toroidal drain basin
26. Rectangularly toroidal-drain-basin cover
27. Rectangular container floor
28. Rectangularly toroidal inside irrigation channel
29. Rectangularly toroidal outside irrigation channel
30. Rectangularly toroidal socket receptacle
31. Rectangular drain basin
32. Ball bearings
33. Point-contact bearing surface
34. Bolt
35. Flange
36. Positional fluid container
37. Plant
38. Soil
39. Positioning ridge
40. Filling aperture
41. Soil-covering fluid containers
42. Fluid-input aperture Reference is made first to FIGS. 1–2. A plant container 1 has a container floor 2 proximate a container base 3 and a container perimeter 4 extended vertically upward from proximate the container base 3. A plurality of ball wheels 5 in sockets 6 are positioned in one or more socket receptacles 7 proximate the container base 3. A fluid outlet 8 proximate a bottom edge of the container floor 2 in working relationship with sources of water and fertilizer selectively proximate a top portion 9 of the plant container 1 is an irrigator.

This embodiment has a toroidal drain basin 10 intermediate a raised portion of the container floor 2 and the container perimeter 4. A roof of the socket receptacle is under the raised portion of the container floor 2. The raised portion of the container floor 2 and the toroidal drain basin 10 are correspondingly and generally circular.

Preferably also, this embodiment has a container handle 11 that is extended outward radially from the top portion 9 of the plant container 1. It is then curved downwardly for gripping. In addition to providing convenient gripping, this container handle 11 also provides structural integrity and a base for irrigation features.

Characteristic of this embodiment and most embodiments of this invention, the ball wheels 5 and sockets 6 are substantially hidden from view laterally. There are three or more socket wheels 5. This one has four.

Referring to FIG. 3, the irrigator in this embodiment has an inside toroidal irrigation channel 12 positioned circumferentially proximate the top portion 9 and radially inward from the container perimeter 4. The inside toroidal irrigation channel 12 can be either extended inwardly from or positioned separately from the container perimeter 4.

One or more trickle-irrigation conveyances 13 are in fluid communication intermediate an internal periphery of the inside toroidal irrigation channel 12 and internal portions of the plant container 1. There can be one or a plurality of trickle-irrigation conveyances 13, depending on such factors as type of fertilizer, if any, to be mixed with irrigation water, size of the plant container 1 in proportion to the inside toroidal irrigation channel 12 and type of plant for which a particular planter is intended.

Preferably, the irrigator has a drain-basin cover 14 that can be a removable plate over the toroidal drain basin 10. Intermediate a top surface and a bottom surface of the drain-basin cover 14 is a fluid conveyance 15 that can be a circumferential space intermediate an outside edge of the drain-basin cover 14 and an inside periphery of the container perimeter 4.

Referring to FIG. 4, the irrigator can have an outside toroidal irrigation channel 16 that is extended outward radially from a top portion of the container perimeter 4. One or more trickle-irrigation conveyances 13 are positioned in fluid communication intermediate an internal periphery of the outside toroidal irrigation channel 16 and internal portions of the plant container 1. A container handle 11 can be sized and shaped to be positioned on the outside toroidal irrigation channel 16.

Referring to FIG. 5, an optional return pump 17 can be positioned with a return conveyance 18 intermediate the toroidal drain basin 10 and top portions 9 of the plant container 1 and selectively to such irrigation channels and containers as may be positioned there. A simple bulb pump is representative of foot pumps, a selection of other manual pumps, electrical pumps and wick-action pumps that can be used optionally as desired for particular design preferences. Irrigation water can be reused if its acidity and alkalinity have not been altered adversely, which is very rare and can be remedied readily. Additional fertilizer can be added as required. However, return pumping allows full utilization of all fertilizer added.

Figure 7:
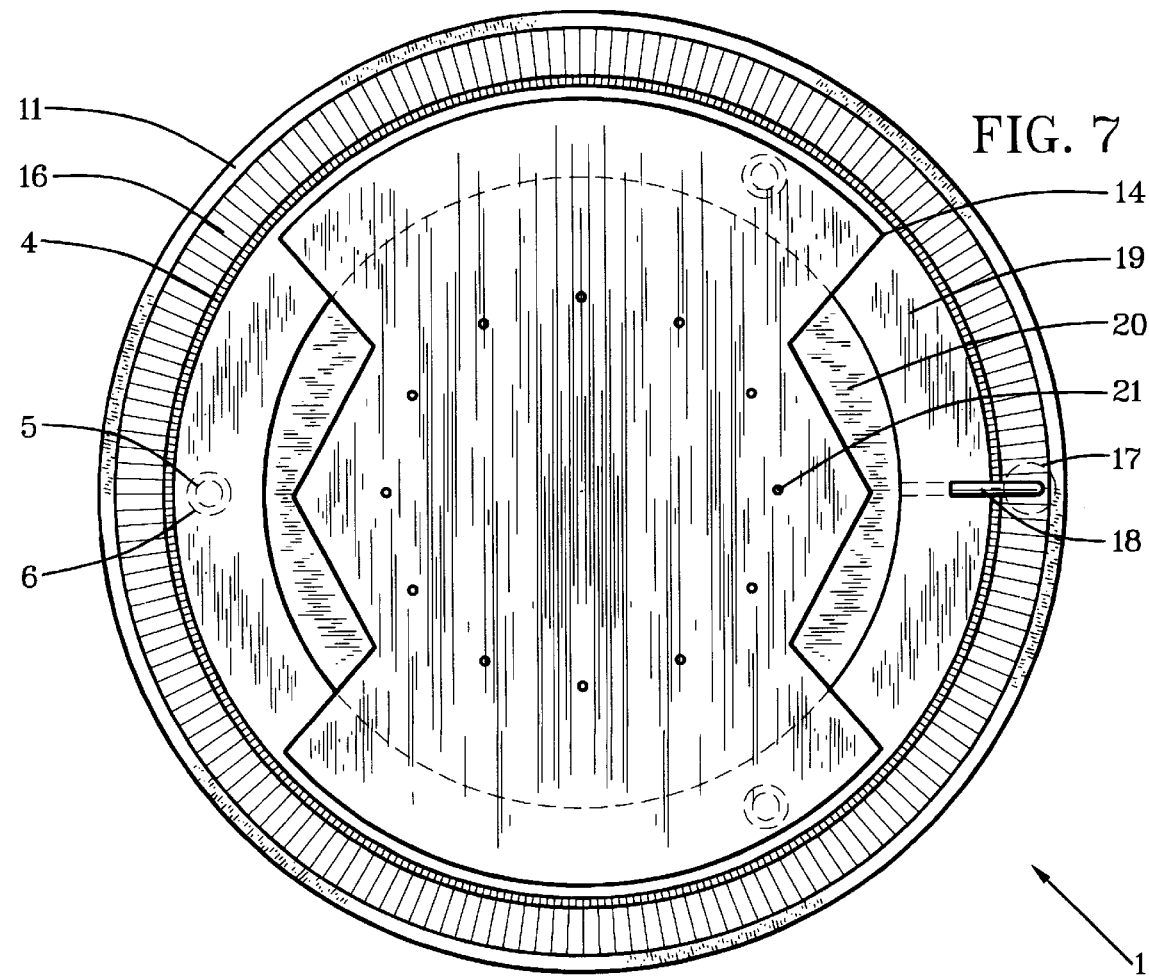
FIG. 7 is a partially cutaway top view of the FIG. 6 illustration.

Referring to FIGS. 6–7, the socket receptacle 7 can be toroidal under a raised toroidal step 19 at a peripheral portion of the container floor 2, such that the container floor 2 has a circular drain basin 20 positioned radially internal from the raised toroidal step 19. This embodiment positions the ball wheels 5 nearer outside edges of the planter but requires a downward extension of the container perimeter 4 to hide the ball wheels 5 and sockets 6 from view. A circular drain basin 20 of this embodiment can be larger, but a bottom portion of the return conveyance 18 must be extended further inward radially to reach a fluid outlet 8 from the circular drain basin 20 for use of the return pump 17. Drain apertures 21 are provided in the drain-basin cover 14 that rests on the raised toroidal step 19.

Figure 8:
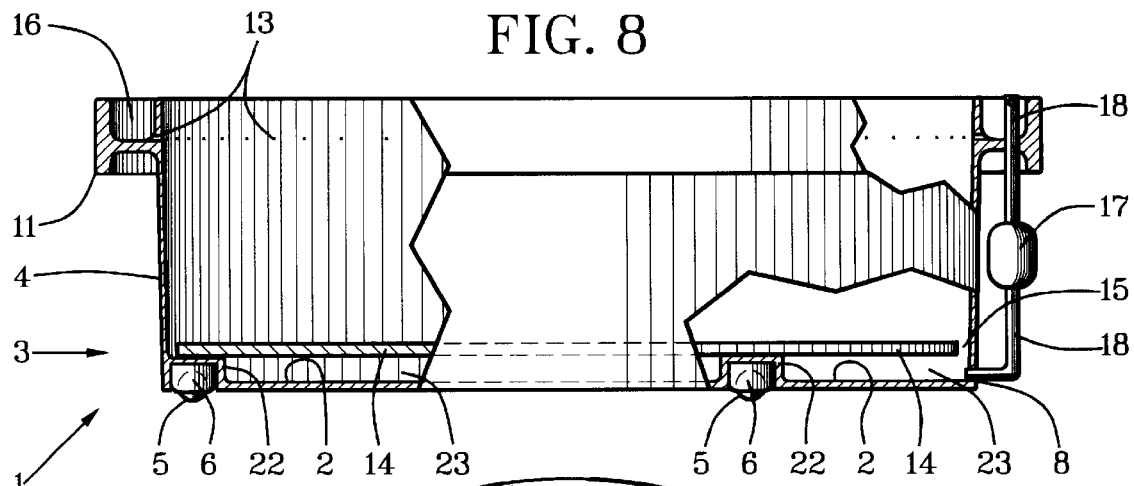
FIG. 8 is a partially cutaway side elevation view of a ball-wheeled planter that is a circular with a plurality of unitary socket receptacles raised within a drain basin with a drain-basin cover and having a toroidal sprinkle-irrigation channel positioned externally from a top portion of a container perimeter in addition to a return pump.
Figure 9:
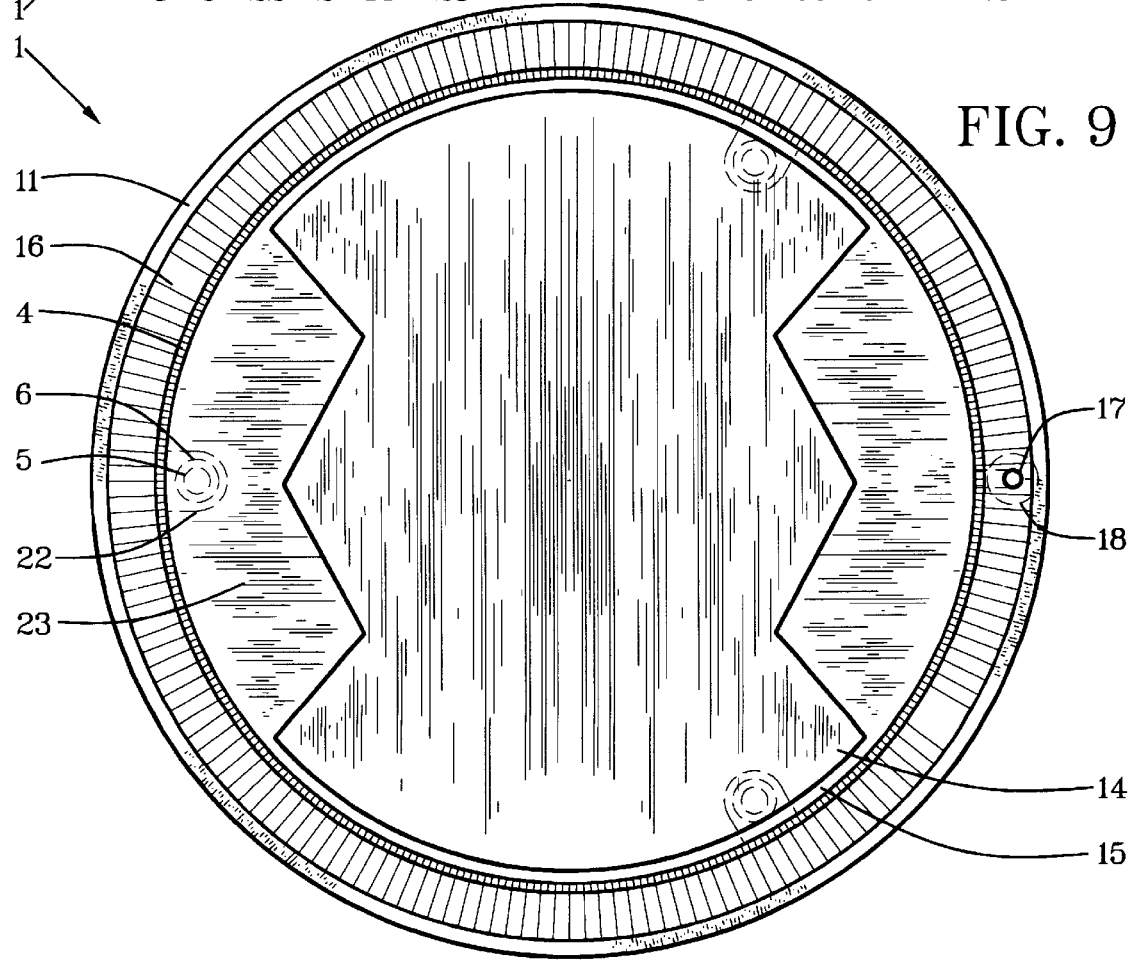
FIG. 9 is a partially cutaway top view of the FIG. 8 illustration.

Referring to FIGS. 8–9, the sockets 6 are in a plurality of unitary socket receptacles 22 that are sized and shaped to receive separate sockets 6 of ball wheels 5 positioned under separately raised portions of the container floor 2 which comprises a full-floor drain basin 23 in a full-floor-drain-basin embodiment. The drain-basin cover 14 rests on tops of the unitary socket receptacles 22 and has a fluid conveyance 15 at its edges that are positioned a slight distance from an internal periphery of the container perimeter 4.

Referring to FIGS. 10–17, the ball-wheeled planter can have a rectangular plant container 24 with a container perimeter 4 that is correspondingly rectangular. Variants of the rectangular plant container 24 are similar to and have substantially the same characteristics as those of the plant container 1 which has been described in relation to FIG. 1 as being generally round or variously circular. The same features are employed for variously round and variously rectangular ball-wheeled planters.

In FIGS. 10–14, the irrigator for a rectangular plant container 24 has a rectangularly toroidal drain-basin 25. As depicted in FIGS. 12–14, a rectangularly toroidal drain-basin cover 26 having fluid conveyances 15 can be positioned on a rectangular container floor 27.

The rectangular plant container 24 can have a rectangularly toroidal inside irrigation channel 28 as shown in FIG. 12 or optionally a rectangularly toroidal outside irrigation channel 29 as shown in FIGS. 13–17. Both have one or more trickle-irrigation conveyances 13.

As depicted in FIG. 15, sockets 6 for ball wheels 5 can be provided with a rectangularly toroidal socket receptacle 30 at an external perimeter of a rectangular drain basin 31.

As illustrated in FIGS. 16–17, unitary socket receptacles 22 can be employed the same for a full-floor drain basin 23 with a rectangular plant container 24 as with a plant container 1 described in relation to FIG. 1 that is not rectangular.

As shown in FIGS. 14–15 and 17, a return pump 17 also can be employed the same for a rectangular plant container 24 as for a plant container 1 described in relation to FIGS. 5–9.

Referring to FIGS. 18–21, a ball wheel 5 in a socket 6 can be provided with low-friction rotation by a plurality of ball bearings 32 as depicted in FIGS. 18–19. Optionally for quieter rotation, bearing-point contact between the spherical ball wheels 5 and point-contact bearing surfaces 33 of bearing bases can be provided. Preferably, either the ball wheels 5 or the point-contact bearing surfaces 33 are non-lubricated solids such as particular grades and types of Teflon® or nylon. Another option is to construct either the ball wheels 5 or the point-contact bearing surfaces 33 of material similar to wheels for roller blades and to construct the other of a hard and smooth metal. Also, both can be coated with non-lubricated solids such as used for coating oil-well equipment. The point-contact bearing surfaces 33 are made of materials having non-lubricated-solid compatibility with surfaces of the ball wheels 5.

As depicted in FIGS. 18 and 20, the socket 6 can be a bolt-on type with bolts 34 in a flange 35 for use in large-area socket receptacles 7. For unitary socket receptacles 22 described in relation to FIGS. 8–9 and 16–17, however, sockets 6 without flanges 35 as depicted in FIGS. 19 and 21 can be employed.

Referring to FIG. 22, an irrigator can have at least one positional fluid container 36 that is positional selectively on a plant container 1, described in relation to FIG. 1, or on a plant container 24, described in relation to FIG. 10. One or more trickle-irrigation conveyances 13 are positioned where desired for irrigating and fertilizing particular plants 37 in soil 38. The positional fluid container 36 can be toroidal as shown and have a positioning ridge 39 for holding it on a top of container handle 11. A filling aperture 40 can be provided for filling with water and fertilizer and for a return conveyance 18 when a return pump 17 is employed. The positional fluid container 36 also can be semi-toroidal or shaped otherwise for particular use conditions and types of plants 37.

This invention is used by providing a plant container 1 or 24 in either of the forms described and having any combination of features described. One or more plants 37 are positioned in soil 38 in a plant container 1 or 24. A fluid container 12, 16, 28, 29 or 36 having trickle-irrigation conveyances 13 is positioned on the plant container 1 or 24 and filled with water that can include water-conveyable fertilizer. The water is allowed to trickle out slowly onto the soil 38 and then to be replenished appropriately with new water and with the return pump 17 if employed.

Figure 23:
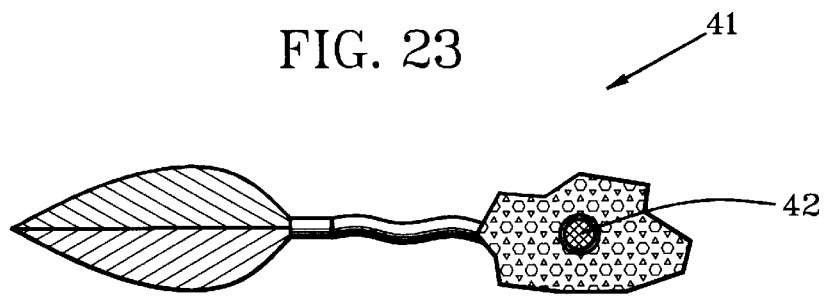
FIG. 23 is a plurality of selectively porous fluid containers that are joined by a conveyance from one having a filling aperture and that are positional on soil in a pant container.
Figure 24:
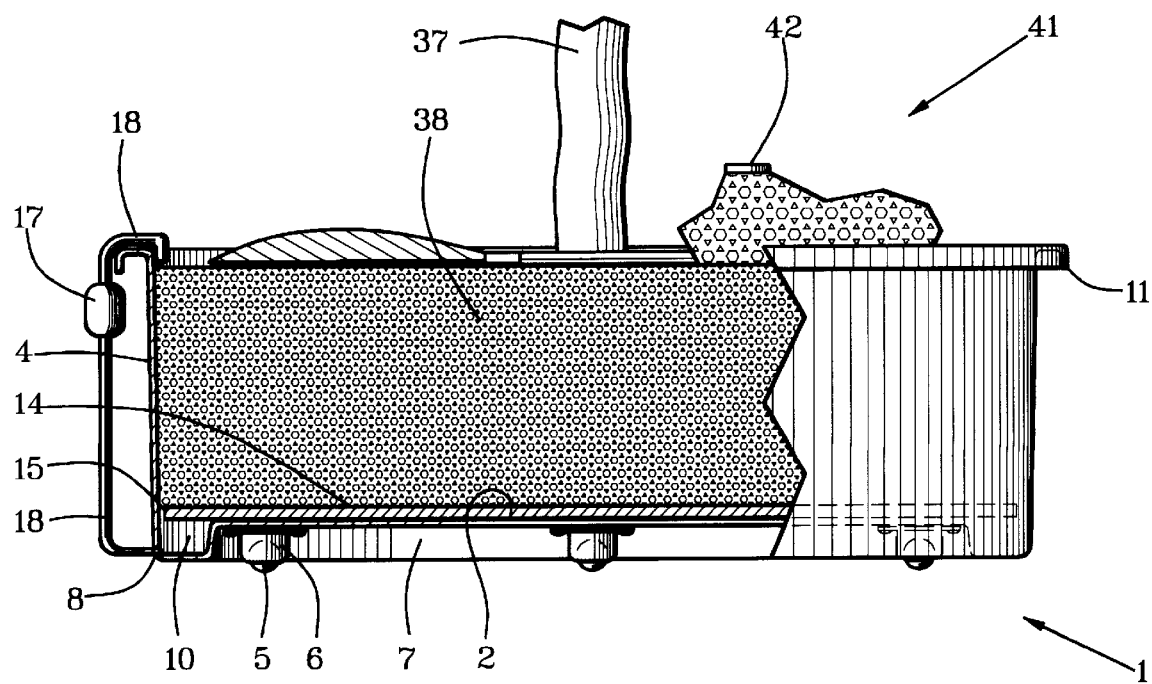
FIG. 24 a partially cutaway side view of the FIG. 23 fluid containers positioned on soil in a plant container which also has an optional return pump.

For using soil-covering fluid containers 41 shown in FIGS. 23–24, the soil is covered sufficiently to allow some breathing while also preventing over exposer to evaporative dryness and to extreme temperature conditions. Preferably, bottom surfaces of the soil-covering fluid containers 41 have very low porosity over a wide area to provide moisture over a large portion of the soil. The breathing of the soil is for fertility-generative organisms in addition to breathing of plant roots and protection of the soil from adverse ambient conditions. Water and selectively fertilizer are added to the soil-covering fluid containers 41 as appropriate for particular plants and ambient conditions. An additional use of the soil-covering containers 41 is for warm water in adversely low temperatures and cold water in adversely hot temperatures.

A new and useful ball-wheeled planter and method having been described, all such foreseeable modifications, adaptations, substitutions of equivalents, mathematical possibilities of combinations of parts, pluralities of parts, applications and forms thereof as described by the following claims and not precluded by prior art are included in this invention.

What is claimed is:

1. A ball-wheeled planter comprising:

a plant container having a container floor proximate a container base and a container perimeter extended vertically upward from the container base;

the plant container being sized and shaped to contain at least one desired plant in soil positioned in the planter;

a plurality of ball wheels in sockets positioned in at least one socket receptacle proximate the container base;

wherein the socket receptacle has an entrance facing downwardly and a receptacle roof under a portion of the container floor;

wherein a portion of the container floor under which the socket receptacle is positioned inward centrally from the container perimeter; and wherein the container floor has a raised portion above the receptacle roof and a drain basin at an external periphery of the raised portion of the container floor.

2. A ball-wheeled planter as described in claim 1 wherein: the container perimeter is circular.

3. A ball-wheeled planter as described in claim 1 wherein: the container is rectangular.

4. A ball-wheeled planter as described in claim 1 wherein: the planter has a planter handle that is extended radially outward from a top portion of the container perimeter.

5. A ball-wheeled planter as described in claim 2 wherein: the planter has a planter handle that is extended radially outward from a top portion of the container perimeter.

6. A ball-wheeled planter as described in claim 3 wherein: the planter has a planter handle that is extended radially outward from a top portion of the container perimeter.

\* \* \* \* \*